COLOR TELEVISION SYNCHRONIZING SYSTEM

Filed July 15, 1949 2 SHEETS—SHEET 1

RICHARD O. GRAY
*INVENTOR.*

BY Francis W. Crotty
HIS ATTORNEY

June 24, 1952 R. O. GRAY 2,601,516

COLOR TELEVISION SYNCHRONIZING SYSTEM

Filed July 15, 1949 2 SHEETS--SHEET 2

RICHARD O. GRAY
*INVENTOR.*

BY Francis W. Crotty
HIS ATTORNEY

Patented June 24, 1952

2,601,516

UNITED STATES PATENT OFFICE 2,601,516

COLOR TELEVISION SYNCHRONIZING SYSTEM

Richard O. Gray, Broadview, Ill., assignor to Zenith Radio Corporation, a corporation of Illinois Application July 15, 1949, Serial No. 104,967

5 Claims. (Cl. 178—69.5)

Figure 1:
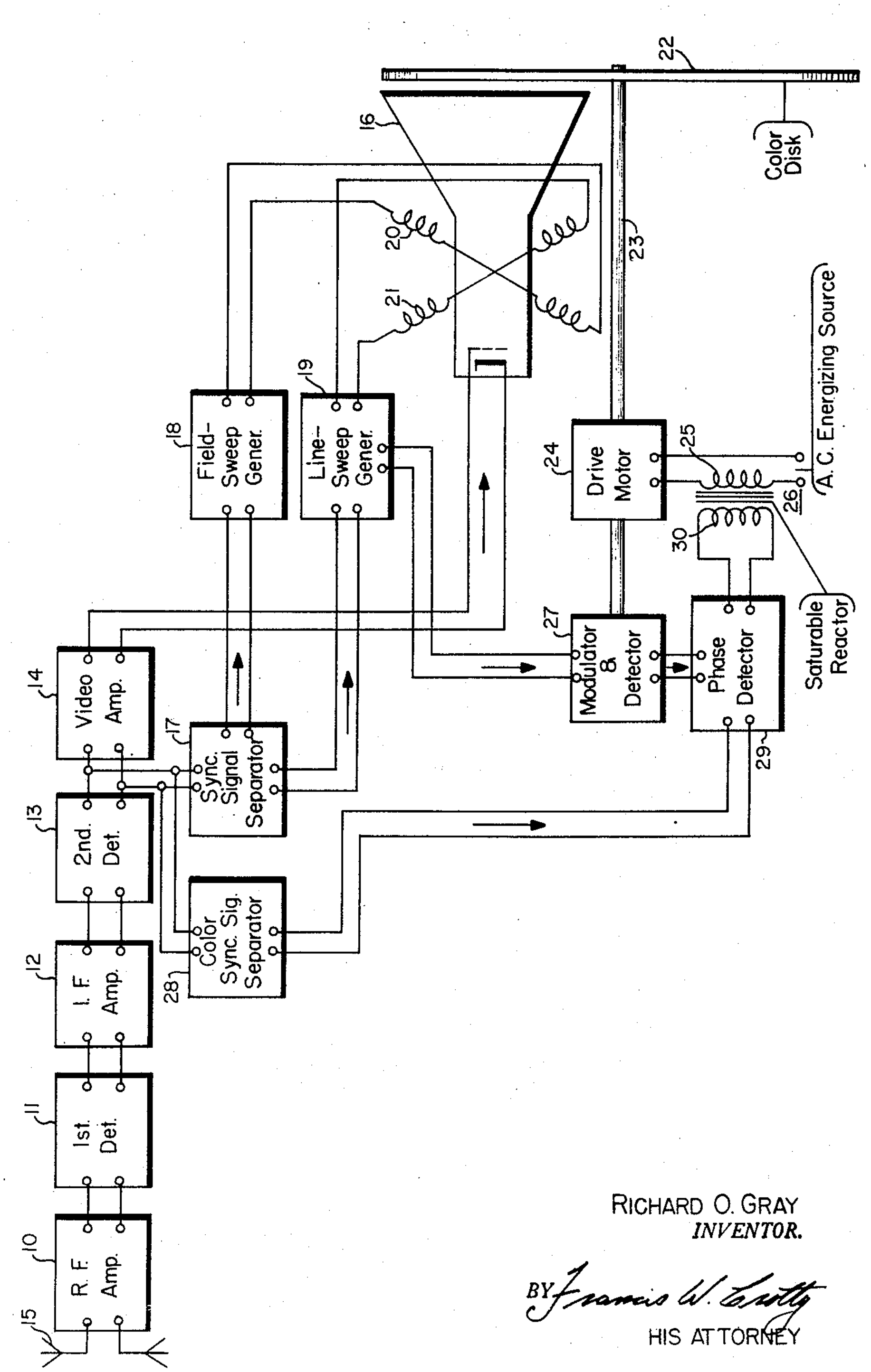

This invention relates to receiver apparatus for utilizing a television signal representing a scanned subject in natural color, and more particularly to a synchronizing system for use in such apparatus to synchronize a color-filter disc therein with a received color television signal.

It has been found experimentally that substantially all colors can be visually simulated in reproduction by the addition in proper proportion or brightness of three color components. These color components are a somewhat orange-red, a nearly pure green, and a violet blue. For convenience, they will be referred to hereinafter as red, green and blue, and shall be designated as the three "standard" colors.

In color television transmission systems of the type under consideration, it is necessary to make a tri-color analysis of the subject scanned by the transmitter picture-converting device. This analysis may be made by passing light from the scanned subject through red, green and blue light filters in a sequential manner. To accomplish this, these filters are frequently mounted on a rotatable shaft in the form of a composite color-filter disc, and this disc is rotated at a predetermined speed so that the filters are placed sequentially in the light path between the scanned subject and the picture-converting device. The light transmitted through the filters is utilized by the converting device to generate video signals in recurring groups of three sequential color fields representing the three standard colors, the preferred sequence of the color fields being red, blue and green. The color television signal transmitted by such a system includes the usual line and field synchronizing-signal components, video-signal components and, in addition, a further synchronizing-signal component which indicates every third field, that is, each group of the three sequential color fields. This further synchronizing-signal component usually takes the form of a burst of pulses that occurs at the beginning of each group of sequential color fields, and shall be referred to herein as the "color synchronizing-signal component" of the television signal.

In the television receivers operating in conjunction with the afore-described color television transmission system, it is usual practice to provide a color-filter disc containing light filters corresponding to those utilized in the transmitter. This color-filter disc is mounted on a rotatable shaft and is driven in synchronism with the received television signal so that the different filters of the color disc are placed sequentially in the light path between an observer and the receiver image-reproducing tube in correspondence with the sequentially received color fields of the television signal. In this manner, the visual effect of an image in full color is reproduced by the receiver.

One system that has been proposed for effecting such synchronism between the receiver color-filter disc and a received television signal, comprises a magnetic generator mechanically coupled to the disc and constructed to generate a signal indicating the rotational speed thereof. This generated signal is compared in a suitable network with a synchronizing signal component of the received television signal, and a signal is developed thereby for controlling the speed of the disc to maintain synchronism between it and the received television signal. This system has proven unsatisfactory as the magnetic generator is relatively complicated and expensive since it requires permanent magnets or excited electro-magnets to produce its field flux, and since it also requires a pick-up coil of a great many turns to generate a signal of sufficient amplitude to be usable for synchronizing purposes. A further objection to the magnetic generator is the fact that it generates a varying magnetic field which may interfere with the deflection of the electron beam in the receiver image tube to cause distortion in the reproduced image.

Because of the inherent disadvantages of the magnetic generator, a similar synchronizing system has been proposed which utilizes an electro-static generator. However, the electro-static generator has also been found to be impractical since it requires a relatively large variable capacitor in order that the generated signal may have an appreciable amplitude. In addition to its cumbersome size, this capacitor presents a relatively high impedance to stray electro-static fields and extraneous signals representing the stray fields may be developed since the generator has no means of filtering out these extraneous signals without affecting the desired signal.

It is an object of the present invention to provide an improved system for synchronizing the color-filter disc in color television apparatus with a synchronizing signal, in which the afore-described disadvantages are substantially obviated.

Figure 2:
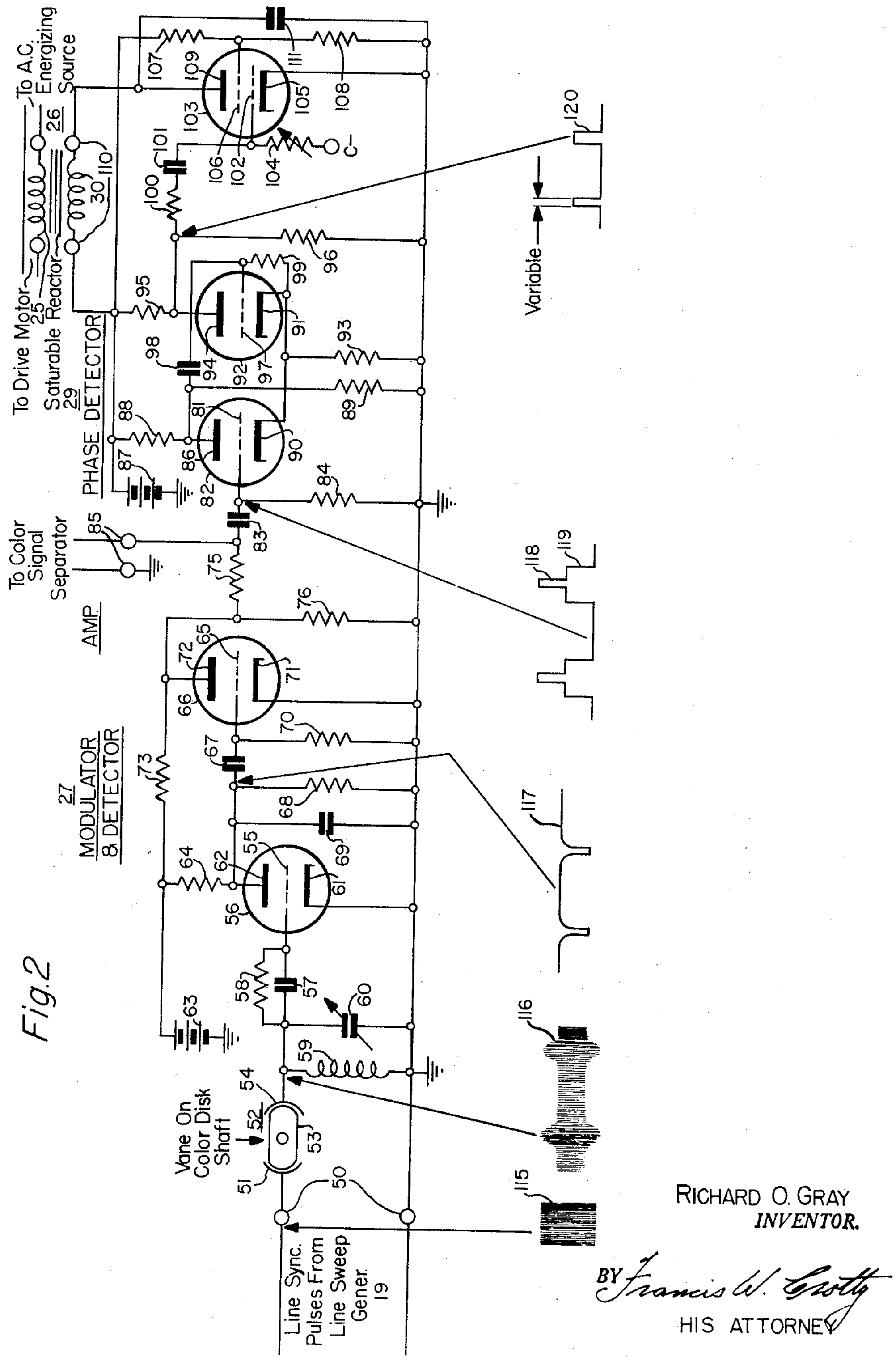

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows in block form a color television receiver embodying the synchronizing system of the present invention, and Figure 2 shows schematically the synchronizing system of the invention.

The color television receiver of Figure 1 includes a usual radio-frequency amplifier 10 of any desired number of stages, a first detector 11, an intermediate-frequency amplifier 12 of one or more stages, a second detector 13, and a video amplifier 14, all connected in well-known manner. The input terminals of the radio-frequency amplifier 10 may be connected to a suitable antenna 15 and the output terminals of the video amplifier 14 are connected to the control electrode and cathode of a receiver image-reproducing device 16.

The line and field synchronizing-signal components of a received television signal may be separated from the other components thereof by means of a synchronizing-signal separator 17 connected to the output terminals of the second detector 13. One pair of output terminals of the separator 17 are connected to a field-sweep generator 18, and a second pair of output terminals of the separator are connected to a line-sweep generator 19. The output terminals of the field-sweep generator 18 and of the line-sweep generator 19 are connected respectively to the field-deflection elements 20 and the line-deflection elements 21 of the reproducing device 16.

A color-filter disc 22 is mounted on a shaft 23, and this shaft is rotated by means of a drive motor 24 to place light filters corresponding to the standard colors sequentially between the screen of the device 16 and an observer, not shown. The input terminals of the motor 24 are connected to a suitable alternating-current source, not shown, through a winding 25 of a saturable reactor 26. A modulator and detector unit 27 is coupled to the shaft 23 to generate a pulse signal indicating the revolutions of the shaft, and this unit operates in a manner to be described hereinafter. The pulse signal output of the unit 27 is utilized for synchronizing purposes, in a manner also to be described. The unit 27 has a pair of input terminals connected to the line-sweep generator 19, or to any suitable high-frequency signal source.

The color synchronizing-signal component of a received color television signal may be separated from the other components of this signal by means of a color synchronizing-signal separator 28 having its input terminals connected to the output terminals of the second detector 13. The output terminals of the separator 28 are connected to a pair of input terminals of a phase detector 29, this latter circuit having further input terminals connected to the output terminals of the unit 27. The output terminals of the phase detector 29 are connected to a winding 30 of the saturable reactor 26. The phase detector 29 may be similar to the one disclosed in copending application Serial No. 99,253, filed June 15, 1949, now Patent No. 2, 558, 390, granted June 26, 1951, entitled "Television Receiver Cathode-Ray Tube Synchronizing Circuits" in the name of Roschke et al., and assigned to the present assignee.

The radio-frequency amplifier 10 and first detector 11 of the color television receiver may be adjusted to tune the receiver to a color television signal intercepted by the antenna 15. This signal is then amplified in the radio-frequency amplifier 10 and heterodyned to the selected intermediate frequency of the receiver in the first detector 11. The intermediate-frequency signal produced by the first detector is amplified in the intermediate-frequency amplifier 12 and detected in the second detector 13. The resulting video signal is amplified in the video amplifier 14 and supplied to the reproducing device 16 to control the intensity of the electron beam in this device, in usual fashion.

The field and line synchronizing-signal components of the received color television signal are removed therefrom by means of the synchronizing-signal separator 17 and are used to drive the field-sweep generator 18 and the line-sweep generator 19 in synchronism with the received signal. These generators, in turn, cause the electron beam in the reproducing device 16 to be scanned across the screen of this device in synchronism with the received signal and, in conjunction with the video signal supplied to the control electrode of this device, enable the device to reproduce the image represented by the color television signal.

The color synchronizing-signal component of the television signal is removed therefrom by means of the separator 28. As previously described, this component usually comprises a burst of pulses recurring at every third field to indicate the groups of standard color fields. The separator 28 may comprise a filter tuned to the repetition frequency of the pulses within each burst, and a rectifier for rectifying these pulses to produce a relatively broad unidirectional color-synchronizing pulse in response to each of the bursts. These relatively broad color synchronizing pulses are supplied to the phase detector 29.

The modulator and detector unit 27 generates, in a manner to be described, a pulse signal indicating the rotational speed of the disc 22. This pulse signal is applied to the phase detector 29 wherein it is compared with the color synchronizing pulses from the separator 28. The phase detector 29 generates a unidirectional control potential having amplitude variations which are proportional to phase variations between the generated pulse signal and the color-synchronizing pulses. This control potential is applied to the winding 30 of the saturable reactor 26 and the resulting current through this winding determines the saturation of the core of the reactor and, therefore, the effective inductance of the winding 25. Any variation of the effective inductance of the winding 25 changes the value of the alternating current potential supplied to the drive motor 24 and, hence, changes the speed of the motor. The system may be arranged so that the color disc is rotated by the motor in synchronism with the sequentially received color fields of the incoming color television signal. Any tendency of the drive motor to run at other than synchronous speed produces a change in the phase relation of the signal compared in the phase detector 29 and a corresponding variation in the current through the winding 30. The change of current in the winding 30 causes a modification in the alternating-current potential supplied to the motor 24 and, hence, the motor speed in a direction to oppose this tendency and maintain synchronism between the color disc and the received color fields.

The modulator and detector unit 27 and the phase detector 29 are shown schematically in Figure 2. The unit 27 includes a pair of input terminals 50 connected to the line-sweep generator 19 of Figure 1, or other suitable high-frequency signal source. One of the terminals 50 is grounded and the other is connected to a stationary electrode 51 of a variable-impedance device 52. The device 52 includes a rotatable vane 53 which is mounted on the shaft 23 of Figure 1 and is rotated thereby between the electrode 51 and a further stationary electrode 54, to vary the impedance between the stationary electrodes 51, 54.

The electrode 54 is coupled to the control electrode 55 of an electron-discharge device 56 through a capacitor 57 shunted by a resistor 58. The electrode 54 is further coupled to ground through an input circuit tuned to the frequency of the line-synchronizing components and comprising an inductance coil 59 shunted by a variable capacitor 60. The cathode 61 of the device 56 is connected to ground and the anode 62 is connected to the positive terminal of a source of unidirectional potential 63 through a resistor 64. The anode 62 is further coupled to the control electrode 65 of an electron-discharge device 66 through a coupling capacitor 67, and the anode is connected to ground through a resistor 68 shunted by a by-pass capacitor 69 the control electrode 65 being connected to ground by means of a grid-leak resistor 70. The cathode 71 of the device 66 is connected to ground, and the anode 72 of this device is connected to the positive terminal of the source 63 through a resistor 73 and to ground through a resistor 76.

The anode 72 of the device 66 is coupled to the control electrode 81 of a device 82 through a series-connected resistor 75 and capacitor 83. The control electrode 81 is connected to ground through a grid-leak resistor 84. The device 82 is included in the circuit of the phase detector 29 of Figure 1, and a pair of input terminals 85 of the phase detector are connected to the separator 28. One of the terminals 85 is connected to the junction of resistor 75 and capacitor 83 and the other is grounded. The anode 86 of the device 82 is connected to the positive terminal of a source of unidirectional potential 87 through a resistor 88 and this anode is connected to ground through a resistor 89. The cathode 90 of the device 82 is connected to the cathode 91 of an electron-discharge device 92, and these cathodes are connected to ground through a common cathode resistor 93. The anode 94 of the device 92 is connected to the positive terminal of the source 87 through the resistor 95 and this anode is connected to ground through a resistor 96. The anode 86 of the device 82 is further coupled to the control electrode 97 of the device 92 through the capacitor 98, and this control electrode is connected to the cathode 91 through a resistor 99.

The anode 94 of the device 92 is connected through a series-connected resistor 100 and capacitor 101, to the control electrode 102 of an electron-discharge device 103, this control electrode being connected to the negative terminal of a biasing source C—, now shown, through an adjustable resistor 104. The cathode 105 of the device 103 is connected to ground. The screen 106 of this device is connected to the positive terminal of the source 87 through a resistor 107 and to ground through a resistor 108. The anode 109 of the device 103 is connected to the positive terminal of the source 87 through a winding 30 of the saturable reactor 26, this winding being connected across the output terminals 110 of the phase-detector 29. The anode 109 of the device 103 is by-passed to ground through a capacitor 111.

The line-synchronizing signals from the line-sweep generator 19 are supplied to the input terminals 50 as designated by the wave form 115. The vane 53 is mounted on the color-disc shaft 23 of Figure 1, and rotation of this vane alters the impedance between electrodes 51 and 54 so that the signal 115 is passed to the tuned circuit 59—60 with maximum amplitude when the vane is aligned with the electrodes 51 and 54 as illustrated and with decreased amplitude for all other positions of the vane. In this manner, the signal 115 is amplitude modulated to indicate the revolutions of the shaft 23 and, hence, of the color disc 22, the modulated signal being designated by the wave form 116.

The assembly 52 may take any suitable form and the illustrated embodiment may be used in conjunction with a color disc having a first group of three color filters corresponding to the three standard colors mounted on one-half of its face, and a second group of three color filters corresponding to the three standard colors mounted on the other half of its face. The vane 53 causes a pulse to be modulated on the signal 115 for each 180° rotation of the shaft 23, and the vane is oriented on the shaft so that this pulse occurs immediately preceding each of the two groups of color filters on the color disc.

The device 56 is connected to form a well-known grid-leak detector circuit, and the network 59, 60 forms a tuned input circuit to the detector. The network 59, 60 is tuned to the carrier frequency of the modulated signal 116 which is passed to the detector, substantially all extraneous signals being suppressed by this network. The circuit of the device 56 detects the amplitude-modulated signal 116, and the values of the circuit elements are made such that the device acts as a limiter for the peaks of the signal and, therefore, additionally acts as a shaper for the modulation on the signal 116. Thus, the pulses modulated on the signal 116 appear in the anode circuit of the device 56 reversed in phase and shaped as shown by the wave form 117.

The signal 117 is amplified and reversed in phase by means of the device 66, and positive polarity pulses 118 are supplied to the control electrode 81 of the device 82. The relative broad positive polarity pulses are also supplied to the control electrode 81 from the color synchronizing-signal separator 28 of Figure 1 by way of the terminals 85, these latter pulses being designated 119 and appearing as pedestals for the narrow pulses 118, as shown.

The devices 82 and 92 are connected to form a well-known multivibrator circuit in which the device 92 is normally conductive and the device 82 is non-conductive. The application of a positive pulse of sufficient amplitude to the control electrode 81 trips the multivibrator to a secondary condition wherein device 82 becomes conductive and the device 92 non-conductive. The multivibrator remains in this secondary condition, after the trailing edge of the applied positive pulse, for a time determined by the time-constant of the capacitor 98 and its associated circuit. In the present system, the multivibrator is arranged so that the leading edge of a pulse 118 pedestalled on a pulse 119 trips it from its normal to its secondary condition and the time-constant of the circuit of capacitor 98 is such that the potential drop immediately following the trailing edge of the pedestal pulse 119 is sufficient to return the multivibrator to its original condition.

In this manner, the multivibrator generates varying-duration pulses, designated by the wave form 120, across the resistor 96. The duration of the individual pulses 120 depends upon the time of the operating cycle of the multivibrator as defined by the phase relation between the compared pulses 118 and 119. The pulses 120 are amplified in the device 103, and the amplified pulses appearing in the anode circuit of this device are integrated by means of the capacitor 111 in conjunction with the winding 30 whereby a unidirectional control signal flows through this winding, the control signal having amplitude variations corresponding with changes in the phase relation between the color-synchronizing pulses 119 and the pulses 118 produced by the detector 27. Variations in the signal through the winding 30, in turn, cause variations in the saturation of the core of the saturable reactor 26 which, in turn, cause an alteration in the effective inductance of the winding 25. The alteration in the effective inductance of the winding 25 alters the alternating current potential supplied to the motor 24 and, hence, the speed of the motor. Any tendency of the motor to run at other than synchronous speed causes a phase displacement between the pulse signals 118 and 119, and this displacement gives rise to an amplitude change in the control signal generated by the phase detector, this change occurring in a direction to compensate for such tendency. For example, should the motor speed tend to decrease below the synchronous speed, the pulses 118 as applied to the phase detector 29 would shift relative to the color-synchronizing pulse 119 in a direction to cause the individual durations of the pulses 120 generated by the multivibrator to decrease a proportional amount. In the manner described, this causes a corresponding increase in the alternating-current potential applied to the motor 24 and, hence, the speed of the motor tends to increase to the synchronous speed. The reverse operation takes place should the speed of the motor tend to increase above the synchronous speed. The resistor 104 is made variable to establish a desired initial relation between the speed of the color disc and the incoming color-synchronizing signal, this relation being maintained in the afore-described manner.

In the illustrated embodiment, the signal 115 which is modulated and detected in the unit 27 of Figure 1 is derived from the line-sweep generator 19. It is to be understood, however, that any suitable high-frequency signal may be utilized for this purpose, the line-synchronizing signal being used merely for purposes of convenience and economy.

The assembly 52 which functions to modulate the signal 115 is relatively small and inexpensive as compared to capacitor assemblies required in the prior art type of electro-static generators. Moreover, substantially all extraneous signals produced by the assembly 52 due to stray electrostatic fields are suppressed by the tuned circuit 59, 60 since this circuit supplies only the signal frequency of the signal 115 to the detector circuit. Therefore, these extraneous signals do not appear in the output of the present system.

The present invention has been described in conjunction with a color television receiver since it finds ready application in such apparatus.

However, it is apparent that the synchronizing system may also be used in conjunction with a color television transmitter for the same synchronizing purpose.

While a particular embodiment of the invention has been shown and described modifications may be made and it is intended in the appended claims to cover all such modifications as fall within the true spirit and scope of the invention.

I claim:

1. A system for synchronizing the speed of an electric motor with a synchronizing signal comprising: a carrier-signal source; a variable-impedance device coupled to said source and driven by said motor for modulating said carrier signal in accordance with the revolutions of said motor; a detector circuit coupled to said variable-impedance device for detecting said modulated signal to produce a signal indicating the revolutions of said motor; a phase-detector circuit coupled to said first-named detector circuit and responsive to said synchronizing signal and to said revolutions-indicating signal for producing a control signal having variations proportional to phase variations between said synchronizing signal and said revolutions-indicating signal; and means coupled to said phase-detector circuit and responsive to said control signal for controlling the speed of said motor in a direction to compensate for such phase variation.

2. A system for synchronizing the speed of an electric motor with a synchronizing signal comprising: a carrier-signal source; a variable-impedance device coupled to said source and driven by said motor for modulating said carrier signal in accordance with the revolutions of said motor; a detector circuit for detecting said modulated signal to produce a signal indicating the revolutions of said motor; a circuit tuned to the frequency of said carrier signal coupling said detector circuit to said variable-impedance device; a phase-detector circuit coupled to said first-named detector circuit and responsive to said synchronizing signal and to said revolutions-indicating signal for producing a control signal having amplitude variations proportional to phase variations between said synchronizing signal and said revolutions-indicating signal; and means coupled to said phase detector circuit and responsive to said control signal for controlling the speed of said motor in a direction to compensate for such phase variations.

3. A system for synchronizing the speed of an electric motor with a synchronizing signal comprising: a rotatable shaft mechanically coupled to said motor; a carrier-signal source; a variable impedance device coupled to said source and including a vane supported by said shaft to be rotated between a pair of stationary electrodes to vary the capacitive impedance between said electrodes to modulate said carrier signal in accordance with the revolutions of said shaft; a detector circuit coupled to said variable-impedance device for detecting said modulated signal to produce a signal indicating the revolutions of said shaft; a phase-detector circuit coupled to said first-named detector circuit and responsive to said synchronizing signal and to said revolutions-indicating signal for producing a control signal having amplitude variations proportional to phase variations between said synchronizing signal and said revolutions-indicating signal; and means coupled to said phase-detector circuit and responsive to said control signal for controlling the speed of said motor in a direction to compensate for such phase variation.

4. In a wave-signal receiver including a carrier-signal source and a driving motor to be synchronized with a received synchronizing signal, a control system comprising: a variable-impedance device coupled to said source and driven by said motor for modulating a carrier signal derived from said source in accordance with the revolutions of said motor; a detector circuit coupled to said variable-impedance device for detecting said modulated signal to produce a signal indicating the revolutions of said motor; a phase-detector circuit coupled to said first-named detector circuit and responsive to said synchronizing signal and to said revolutions-indicating signal for producing a control signal having variations proportional to phase variations between said synchronizing signal and said revolutions-indicating signal; and means coupled to said phase-detector circuit and responsive to said control signal for controlling the speed of said motor in a direction to compensate for such phase variations.

5. In a television receiver including a sweep-signal generator and a driving motor to be synchronized with a received synchronizing signal, a control system comprising: a variable-impedance device coupled to said sweep-signal generator and driven by said motor for modulating a signal derived from said generator in accordance with the revolutions of said motor; a detector circuit coupled to said variable-impedance device for detecting said modulated signal to produce a signal indicating the revolutions of said motor; a phase-detector circuit coupled to said first-named detector circuit and responsive to said synchronizing signal and to said revolutions-indicating signal for producing a control signal having variations proportional to phase variations between said synchronizing signal and said revolutions-indicating signal; and means coupled to said phase-detector circuit and responsive to said control signal for controlling the speed of said motor in a direction to compensate for such phase variation.

RICHARD O. GRAY.

REFERENCES CITED

The following references are of record in the file of this patent:

UNITED STATES PATENTS

| Number | Name | Date |
|---|---|---|
| 2,309,506 | Herbst | Jan. 26, 1943 |
| 2,319,789 | Chambers | May 25, 1943 |
| 2,323,905 | Goldmark | July 13, 1943 |
| 2,428,946 | Somers | Oct. 14, 1947 |
| 2,437,690 | Goldmark | Mar. 16, 1948 |
| 2,509,730 | Dome | May 30, 1950 |